US010533479B2

(12) United States Patent
Ishikawa et al.

(10) Patent No.: US 10,533,479 B2
(45) Date of Patent: Jan. 14, 2020

(54) VALVE APPARATUS, AND EXHAUST HEAT RECOVERY DEVICE

(71) Applicant: FUTABA INDUSTRIAL CO., LTD., Okazaki-shi, Aichi (JP)

(72) Inventors: Hiromi Ishikawa, Okazaki (JP); Hirohisa Okami, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 196 days.

(21) Appl. No.: 15/535,810

(22) PCT Filed: Aug. 31, 2015

(86) PCT No.: PCT/JP2015/074707
§ 371 (c)(1),
(2) Date: Jun. 14, 2017

(87) PCT Pub. No.: WO2016/098395
PCT Pub. Date: Jun. 23, 2016

(65) Prior Publication Data
US 2017/0328257 A1     Nov. 16, 2017

(30) Foreign Application Priority Data

Dec. 17, 2014  (JP) .................................. 2014-255335

(51) Int. Cl.
*F01N 5/02*        (2006.01)
*F01N 13/08*       (2010.01)

(52) U.S. Cl.
CPC ............... *F01N 5/02* (2013.01); *F01N 13/08* (2013.01)

(58) Field of Classification Search
CPC . F01N 1/166; F01N 13/08; F01N 5/02; F16K 1/36
See application file for complete search history.

(56) References Cited

U.S. PATENT DOCUMENTS 1,980,495 A * 11/1934 Muir .......................... F16K 1/20
                                                           222/505
2,389,817 A * 11/1945 Rider .................... F16K 1/2007
                                                           137/80

(Continued)

FOREIGN PATENT DOCUMENTS

JP        S49-90924 U     8/1974
JP        62181762 U1    11/1987

(Continued)

OTHER PUBLICATIONS

Notification of Transmittal of Translation of IPRP (Form PCT/IB/338), International Preliminary Report on Patentability (Chapter I of the Patent Cooperation Treaty) (Form PCT/IB/373) and Translation of Written Opinion of the International Search Authority (Form PCT/ISA/237) for International Patent Application No. PCT/JP2015/074707, dated Jun. 29, 2017 (6 pages).

(Continued)

*Primary Examiner* — Jason D Shanske
*Assistant Examiner* — Matthew T Largi
(74) *Attorney, Agent, or Firm* — Withrow & Terranova, P.L.L.C.; Vincent K. Gustafson (57) ABSTRACT

A valve apparatus that opens/closes a flow path for fluids. The valve apparatus comprises a tubular valve seat, and a valve. The valve comprises a valve body and a peripheral part. The peripheral part extends around an outer circumference of the valve seat from a periphery of the valve body towards upstream of the flow path for fluids.

6 Claims, 4 Drawing Sheets

(56) References Cited

U.S. PATENT DOCUMENTS

| | | | | |
|---|---|---|---|---|
| 2,694,358 | A | * 11/1954 | Taylor | F01N 13/085 137/454.2 |
| 2,924,235 | A | * 2/1960 | Knudsen | F16K 1/2028 137/461 |
| 4,255,928 | A | * 3/1981 | Jones | F01N 13/085 454/2 |
| 4,854,342 | A | * 8/1989 | Polan | A62C 35/68 137/516.29 |
| 6,732,511 | B2 | * 5/2004 | Unbehaun | F01N 13/085 60/324 |
| 2008/0029655 | A1 | * 2/2008 | Mabuchi | F01N 5/02 248/58 |
| 2009/0038302 | A1 | * 2/2009 | Yamada | F01N 3/0205 60/320 |
| 2010/0043413 | A1 | * 2/2010 | Orihashi | F01N 3/02 60/320 |
| 2010/0146954 | A1 | 6/2010 | Sloss et al. | |
| 2013/0213497 | A1 | * 8/2013 | Helmsen | F16K 1/36 137/533 |
| 2014/0352286 | A1 | 12/2014 | Kato et al. | |

FOREIGN PATENT DOCUMENTS

| | | | |
|---|---|---|---|
| JP | 09195749 A | * | 7/1997 |
| JP | 2008025380 A | * | 2/2008 |
| JP | 2012512994 A | | 6/2012 |
| JP | 2013-130159 A | | 7/2013 |

OTHER PUBLICATIONS

Notification of Reasons for Refusal for Japanese Patent Application No. 2014-255335, dated Oct. 2, 2018, 7 pages.

Notification of the First Office Action for Chinese Patent Application No. 201580068781.0, dated Jun. 26, 2018 (10 pages including English translation).

International Search Report for International Patent Application No. PCT/JP2015/074707 (Form PCT/ISA/210), dated Nov. 17, 2015 (4 pages including English translation).

Written Opinion for International Patent Application No. PCT/JP2015/074707 (Form PCT/ISA/237), dated Nov. 17, 2015, 2015 (6 pages including English machine translation).

* cited by examiner

VALVE APPARATUS, AND EXHAUST HEAT RECOVERY DEVICE

CROSS-REFERENCE TO RELATED APPLICATIONS

This application is a 35 U.S.C. § 371 national phase filing of International Application No. PCT/JP2015/074707 filed on Aug. 31, 2015, and application claims the benefit of Japanese Patent Application No. 2014-255335 filed on Dec. 17, 2014 with the Japan Patent Office. The entire disclosures of International Application No. PCT/JP2015/074707 and Japanese Patent Application No. 2014-255335 are hereby incorporated by reference herein in their respective entireties.

TECHNICAL FIELD

The present disclosure relates to a valve apparatus, and an exhaust heat recovery device that comprises the valve apparatus.

BACKGROUND ART

A valve apparatus that opens/closes a tubular member that forms an exhaust gas flow path for exhaust gas from an internal combustion engine is known (see Patent Document 1). This valve apparatus disclosed in Patent Document 1 is disposed downstream of an exhaust gas inflow section in the exhaust gas flow path in the tubular member, and comprises a valve seat and a valve. The valve seat is shaped like a diffuser, having its downstream-side diameter expand in the exhaust gas flow path. The valve engages with the valve seat via a buffer that is disposed on an inner circumferential surface of the valve seat.

PRIOR ART DOCUMENTS

Patent Documents

Patent Document 1: Japanese Unexamined Patent Application Publication No. 2013-130159

SUMMARY OF THE INVENTION

Problems to be Solved by the Invention

The valve seat disclosed in Patent Document 1 is shaped like a diffuser, and the buffer disposed on the valve apparatus is often formed into a mesh. Conventional valve apparatuses therefore had a problem that the exhaust gas that flows through the flow path easily leaked out through the buffer disposed between the valve seat and the valve.

In other words, it is required to improve shut-off performance of a valve apparatus when the flow path is closed.

In one aspect of the present disclosure, it is therefore desirable to improve the shut-off performance of a valve apparatus when the flow path is closed.

Means for Solving the Problems

One aspect of the present disclosure relates to a valve apparatus that opens/closes a flow path for fluids.

This valve apparatus comprises a valve seat and a valve. The valve seat is a tubular member that forms a part of the flow path for fluids. The valve closes the flow path for fluids by engaging with the valve seat.

The valve comprises a valve body and a peripheral part. The peripheral part extends around an outer circumference of the valve seat from the periphery of the valve body towards upstream of the flow path for fluids.

According to such a valve apparatus, the peripheral part covers an outer circumferential part of the valve seat when the valve is closed. For this reason, a fluid that flows through the flow path needs to flow backwards in the flow path for fluids in order to outflow from between the valve seat and the valve.

As a result of this, outflow of the fluid from between the valve seat and the valve can be reduced according to the valve apparatus in one aspect of the present disclosure.

In other words, the valve apparatus in one aspect of the present disclosure can improve its shut-off performance when the valve is closed.

According to the valve apparatus in one aspect of the present disclosure, the peripheral part engages with the outer circumferential part of the valve seat (that is, the peripheral part covers the outer circumferential part of the valve seat); thus, a buffer such as a mesh material can be disposed not on an inner circumference of the valve seat, but on an outer circumference of the valve seat. This can reduce the outflow of the fluids from between the valve seat and the valve according to the valve apparatus in one aspect of the present disclosure.

The valve body may comprise a convex portion that is formed inwardly in the radial direction, in relation to the inner circumference of the valve seat and protrudes to form an outward curve towards the upstream of the flow path for fluids.

A tip of this convex portion is positioned inwardly, in the radial direction, in relation to the valve seat. The flow of the fluids can therefore be restricted by this convex portion, and thus the outflow of the fluids from between the valve seat and the valve can be further reduced, according to the valve apparatus in one aspect of the present disclosure.

The valve apparatus in one aspect of the present disclosure may further comprise a buffering section that comprises a buffer abutting the peripheral part disposed on an outer circumferential surface of the valve seat. In this case, a downstream-end portion of the buffering section, situated at a downstream side in the flow path for fluids, may be disposed upstream of a downstream-end portion of the valve seat in the flow path for fluids.

That is, in the valve apparatus in one aspect of the present disclosure, a length of a flow path for fluids to reach the downstream-end portion of the buffering section may be elongated. As a result of this, the outflow of the fluids through the buffer can be reduced and the shut-off performance can be further improved, according to the valve apparatus in one aspect of the present disclosure.

One aspect of the present disclosure may be an exhaust heat recovery device that comprises an exhaust pipe, a shell member, a heat exchange section, an inflow section, and a valve apparatus.

The exhaust pipe forms a flow path for an exhaust gas, which is one of the fluids. The shell member covers an exterior of the exhaust pipe. The heat exchange section is disposed between the exhaust pipe and the shell member, and comprises a heat exchanger that exchanges heat between the exhaust gas and a low-temperature fluid. The inflow section comprises an inflow path for the exhaust gas to flow from the exhaust pipe into the heat exchange section.

The valve apparatus here is the valve apparatus according to one aspect of the present disclosure, and is disposed downstream of the inflow section.

Such an exhaust heat recovery device can reduce the outflow of the exhaust gas when the valve is closed, and thus can increase the flow volume of the exhaust gas that flows into the heat exchange section. This can result in improving efficiency of heat-recovery from exhaust heat according to the exhaust heat recovery device in one aspect of the present disclosure.

In the exhaust heat recovery device in one aspect of the present disclosure, a downstream-end portion of the exhaust pipe, situated at a downstream side of the exhaust gas flow path, may be referred to as an exhaust downstream end; and the exhaust downstream end may be disposed downstream of a downstream-end portion of the heat exchanger in the exhaust gas flow path.

In this case, the inflow section may comprise an inlet-forming section and a guiding member. The inlet-forming section is an area on the exhaust pipe, from the exhaust downstream end to a point corresponding to the downstream-end portion of the heat exchanger. The guiding member is a member that is disposed, with a clearance from the inlet-forming section, to cover at least a part of an exterior of the inlet-forming section along the radial direction. The guiding member functions as the valve seat.

A surface of this guiding member, the surface being close to a portion of the guiding member that is connected to the heat exchange section and the surface radially facing an axial center of the exhaust pipe, may be disposed inwardly, in the radial direction of the exhaust pipe, in relation to an end portion of the heat exchanger situated on a side closer to the axial center of the exhaust pipe. The surface of the guiding member, the surface being close to the portion of the guiding member that is connected to the heat exchange section and the surface radially facing the axial center of the exhaust pipe, may be disposed on a straight line that extends along an axial direction of the exhaust pipe from the end portion of the heat exchanger, the end portion situated on the side closer to the axial center of the exhaust pipe.

Such an inflow section of the exhaust heat recovery device can reduce narrowing of the exhaust gas flow path to the heat exchanger, and thus can reduce lowering of pressure loss at an inflow port from the inflow section to the heat exchange section.

This enables the exhaust gas to reach deep into the heat exchange section, and thus enables recovery of a large volume of heat from the exhaust gas according to the exhaust heat recovery device in one aspect of the present disclosure.

EXPLANATION OF REFERENCE NUMERALS

1 . . . exhaust heat recovery device, 2 . . . exhaust portion, 4 . . . shell member, 6 . . . heat exchange section, 8 . . . inflow section, 10 . . . valve apparatus, 12 . . . exhaust pipe, 14 . . . exhaust pipe, 16 . . . upstream end, 18 . . . exhaust downstream end, 20 . . . outer covering member, 22 . . . lid member, 24 . . . holding member, 28 . . . heat exchange chamber, 30 . . . heat exchanger, 32 . . . plate, 34 . . . inflow pipe, 36 . . . outflow pipe, 38 . . . end portion, 40 . . . clearance, 42 . . . clearance, 44 . . . clearance, 50 . . . inlet-forming section, 52 . . . heat-exchanger corresponding region 56 . . . guiding member, 58 . . . tip part, 60 . . . main body part, 62 . . . heat-exchanger-facing inner surface, 64 . . . guiding downstream end, 74 . . . valve seat, 76 . . . valve, 78 . . . valve body, 80 . . . peripheral part, 82 . . . convex portion, 84 . . . buffering section, 90 . . . internal combustion engine, 92 . . . exhaust gas, 94 . . . coolant, 100 . . . muffler, 102 . . . outer shell, 104 . . . inlet pipe, 106 . . . outlet pipe, 108 . . . intermediate pipe, 110,112,114 . . . partition wall.

MODE FOR CARRYING OUT THE INVENTION

Hereinafter, an embodiment of the present disclosure will be explained by way of example with reference to the drawings.

<Exhaust Heat Recovery Device>

Figure 1:
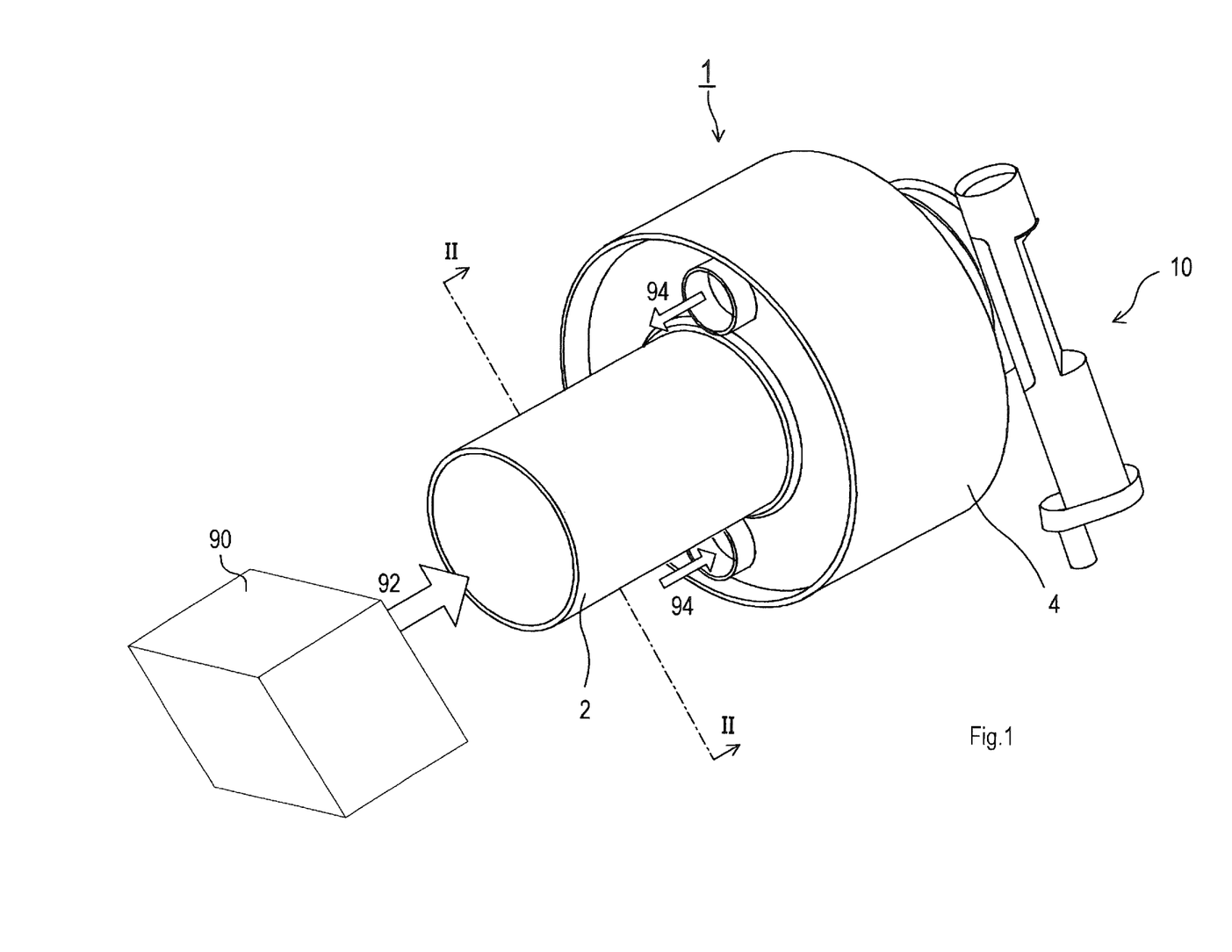
FIG. 1 is a perspective view showing an external appearance of an exhaust heat recovery device according to an embodiment.

An exhaust heat recovery device 1 shown in FIG. 1 is mounted in a moving object that comprises an internal combustion engine 90. This exhaust heat recovery device 1 recovers heat from an exhaust gas 92 by heat exchange, having the exhaust gas 92 from the internal combustion engine 90 as a high-temperature fluid and having a coolant 94 from the internal combustion engine 90 as a low-temperature fluid. The coolant 94 in the present embodiment may be a water-based coolant, or may be an oil.

The exhaust heat recovery device 1 of the present embodiment comprises an exhaust portion 2, a shell member 4, a heat exchange section 6 (see FIG. 2), an inflow section 8 (see FIG. 2), and a valve apparatus 10.

The exhaust portion 2 guides the exhaust gas 92 from the internal combustion engine 90 towards downstream. The shell member 4 covers the exterior of the exhaust portion 2. The heat exchange section 6 comprises a heat exchanger 30 (see FIG. 2) that is disposed between the exhaust portion 2 and the shell member 4, and exchanges heat between the exhaust gas 92, as the high-temperature fluid, and the coolant 94, as the low-temperature fluid.

The inflow section 8 is configured to cause the exhaust gas 92 to flow from the exhaust portion 2 into the heat exchange section 6. The valve apparatus 10 is a valve apparatus that opens/closes a flow path for the exhaust gas 92, and is disposed downstream of the inflow section 8.

Figure 2:
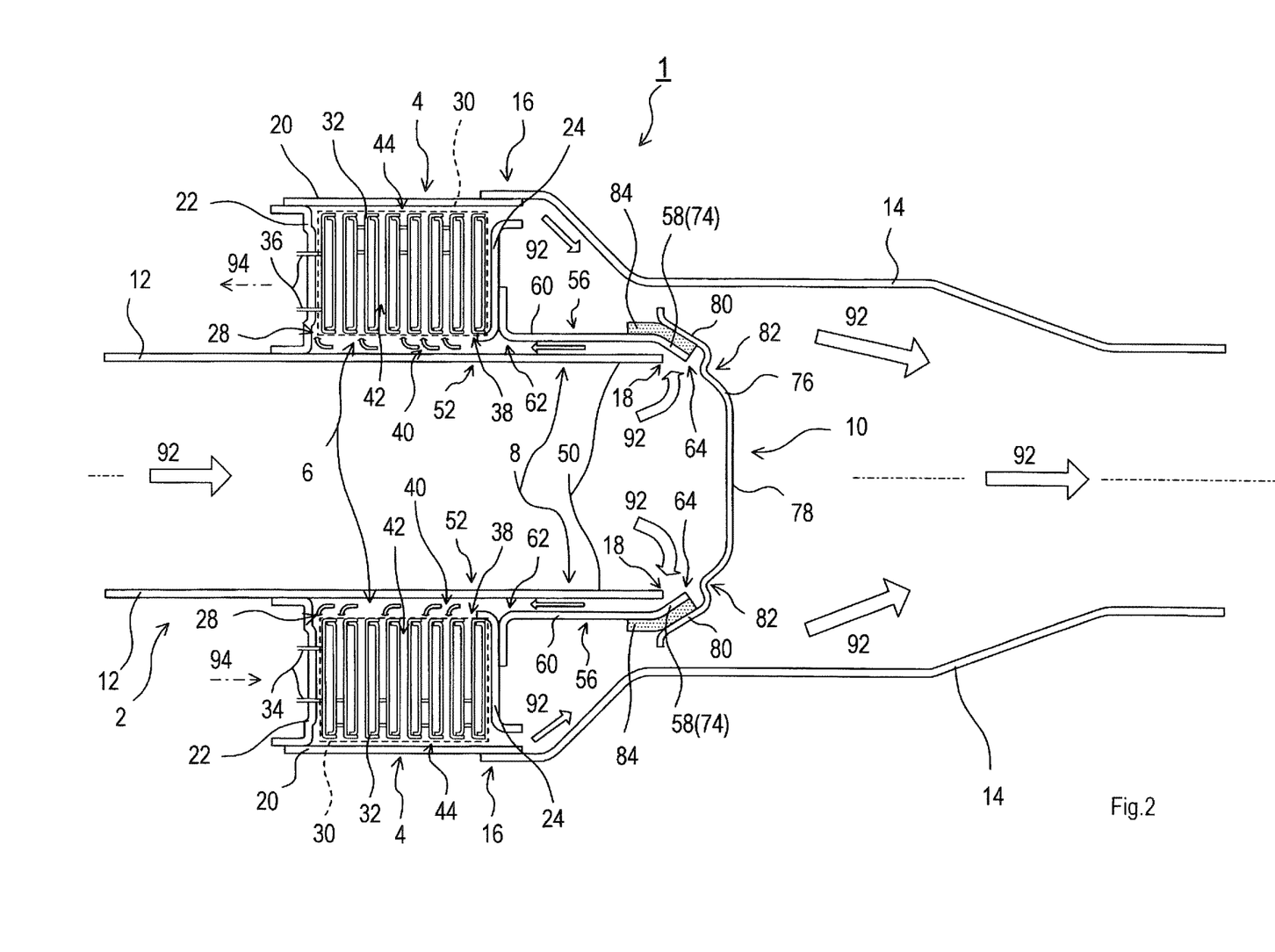
FIG. 2 is a sectional view of the exhaust heat recovery device when a valve is closed, taken along line II-II in FIG. 1.

As shown in FIG. 2, the exhaust portion 2 comprises an exhaust pipe 12. The exhaust pipe 12 is a cylindrical member with both ends open. The exhaust gas 92 flows into an upstream-end portion of the exhaust pipe 12.

The shell member 4 comprises an exhaust pipe 14, an outer covering member 20, a lid member 22, and a holding member 24.

The exhaust pipe 14 is a cylindrical member in its entirety. An upstream end 16, which is one end of the exhaust pipe 14, comprises an aperture that has an inner diameter greater than an outer diameter of the exhaust pipe 12. An exhaust downstream end 18, which is an end portion of the exhaust pipe 12 opposite the upstream-end portion of the exhaust pipe 12, is disposed in an interior space of the upstream end 16 of the exhaust pipe 14, without contact with the shell member 4.

The outer covering member 20 is a cylindrical member that has an inner diameter greater than a diameter of the exhaust pipe 12. A downstream-end portion of the outer covering member 20 is coupled to the upstream end 16 of the exhaust pipe 14.

The lid member 22 closes an aperture of the outer covering member 20, the aperture being situated at an upstream side of the flow path for the exhaust gas 92 in the exhaust pipe 12.

In other words, the outer covering member 20, the lid member 22, and the exhaust pipe 12 form a heat exchange chamber 28 that is a circular space enclosed by the outer covering member 20, the lid member 22, and the exhaust pipe 12.

The heat exchanger 30 disposed in this heat exchange chamber 28 is a so-called stacked plate heat exchanger that comprises plates 32. Each of the plates 32 is a member, inside of which the coolant 94 flows through. The plates 32 are stacked to leave a clearance 42 between outer surfaces of two plates 32 that are adjacent to each other along an axial direction of the exhaust pipe 12. The coolant 94 flows into each of the plates 32 from outside of the heat exchanger 30 through an inflow pipe 34. The coolant 94 that flowed inside each of the plates 32 then flows out to the outside of the heat exchanger 30 through an outflow pipe 36.

The heat exchanger 30 is disposed so as to leave a clearance 40 between a radially inner periphery of each of the plates 32 and an outer surface of the exhaust pipe 12. The heat exchanger 30 is also disposed so as to leave a clearance 44 between a radially outer periphery of each of the plates 32 and an inner surface of the outer covering member 20.

In the present embodiment, heat is exchanged by having the exhaust gas 92 that flows through the clearance 40, clearances 42, and the clearance 44 as the high-temperature fluid, and having the coolant 94 that flows inside each of the plates 32 as the low-temperature fluid. In other words, the heat exchange chamber 28 that is provided with the heat exchanger 30 functions as the heat exchange section 6.

The holding member 24 holds the heat exchanger 30 that is disposed in the heat exchange chamber 28.

Hereinafter, a region that is a part of the exhaust pipe 12, and is from the exhaust downstream end 18 to a heat-exchanger corresponding region 52 (hereinafter simply referred to as "region 52") of the exhaust pipe 12 is referred to as an inlet-forming section 50. The region 52 mentioned here is a region of the exhaust pipe 12 situated upstream of the exhaust downstream end 18. More specifically, the region 52, a region of the exhaust pipe 12, faces one of the plates 32 that configure the heat exchanger 30; the one of the plates 32 (hereinafter referred to as a downstream plate 32) is disposed at the downstream end of the plates 32 along the flow path for the exhaust gas 92 in the exhaust pipe 12.

The inflow section 8 is formed as a double pipe having the inlet-forming section 50 as an inner pipe and a guiding member 56 as an outer pipe.

The guiding member 56 is a cylindrical member with both ends open, and has an inner diameter greater than an outer diameter of the inlet-forming section 50 of the exhaust pipe 12. This guiding member 56 comprises a tip part 58, and a main body part 60.

The main body part 60 is disposed to cover an exterior of the inlet-forming section 50 with a clearance between the main body part 60 and the inlet-forming section 50. A radially inner surface of an end part of the guiding member 56 (that is, a heat-exchanger-facing inner surface 62) is disposed inwards in the radial direction of the exhaust pipe 12 in relation to an end portion 38, the end part being close to a portion of the guiding member 56 that is connected to the holding member 24. The end portion 38 here is an end portion of the heat exchanger 30 situated on a side closer to the axial center of the exhaust pipe 12. The end portion 38 is, for example, an inner diameter periphery of the plates 32.

In the main body part 60, the tip part 58 is coupled to the holding member 24. This tip part 58 is formed into a tapered nozzle-like shape. A guiding downstream end 64, which is a tapered tip of the tip part 58, is disposed to form an aperture between the guiding downstream end 64 and the exhaust downstream end 18 in the radial direction of the exhaust pipe 12. This aperture functions as an inflow port for the exhaust gas 92 to flow into the heat exchange section 6.

<Configuration of Valve Apparatus>

The valve apparatus 10 comprises a valve seat 74, and a valve 76.

The valve seat 74 is a tubular member that forms a part of the flow path for the exhaust gas 92, which is a fluid. In the present embodiment, the tip part 58 of the guiding member 56 functions as the valve seat 74.

On an outer circumferential surface of this valve seat 74, a buffering section 84 is formed. This buffering section 84 is a member to which a buffer is attached. A buffer here is a member to moderate an impact of contact with a valve. A buffer in the present embodiment may be, for example, a mesh member that is formed into a mesh-like shape, or other members.

A valve body 78, and a peripheral part 80 are formed on the valve 76.

The valve body 78 is a disk-like member that has a diameter greater than an inner diameter of the guiding downstream end 64 of the guiding member 56. On an end portion of this valve body 78, a convex portion 82 is formed so as to protrude to form an outward curve towards the upstream of the flow path for the exhaust gas 92. This convex portion 82 is formed such that the peak of the convex is situated inwardly, in the radial direction, in relation to an inner circumference of the guiding member 56 (that is, the valve seat 74).

The peripheral part 80 is a part that extends from a periphery of the valve body 78. This peripheral part 80 extends in a direction towards the upstream of the flow path for the exhaust gas 92. What is meant here by saying "extends in a direction towards the upstream of the flow path for the exhaust gas 92" includes extension of the peripheral part 80 to cover the outer circumference of the guiding member 56 (that is, the valve seat 74). More specifically, the peripheral part 80 in the present embodiment extends to a direction that is parallel to the tip part 58 (that is, the valve seat 74) of the guiding member 56. Nevertheless, the direction of extension of the peripheral part 80 may be any "directions towards the upstream of the flow path for the exhaust gas 92", and is not limited to a direction that is parallel to the tip part 58.

The valve apparatus 10 according to the present embodiment pivotally moves about a valve shaft, which is not shown in the drawings, to open the exhaust portion 2 when a liquid temperature of the coolant 94 in the internal combustion engine 90 is higher than a predetermined specific temperature. The valve apparatus 10, meanwhile, pivotally moves about the valve shaft to close the exhaust portion 2 when the liquid temperature of the coolant 94 in the internal combustion engine 90 is lower than the specific temperature.

<Effect of Embodiment>

When the valve is closed in the valve apparatus 10, the peripheral part 80 that extends from the periphery of the valve body 78 covers the outer circumferential part of the valve seat 74. For this reason, the exhaust gas 92 that flows through the exhaust portion 2 (the guiding member 56) needs to flow backwards in the flow path for the exhaust gas 92 in order to flow out from between the valve seat 74 and the valve 76.

Therefore, outflow of the exhaust gas 92 from between the valve seat 74 and the valve 76 can be reduced according to the valve apparatus 10 compared with conventional valve apparatuses.

Moreover, the convex portion 82 that is formed on the valve body 78 is situated inwardly, in the radial direction, in relation to the inner circumference of the guiding member 56, and protrudes to form an outward curve towards the upstream of the flow path for the exhaust gas 92. A tip of the convex portion 82 is therefore positioned inwards, in the radial direction, in relation to the valve seat 74.

The flow of the exhaust gas 92 can therefore be restricted by the convex portion 82 in the valve apparatus 10. Consequently, inflow of the exhaust gas 92 between the outer circumference of the valve seat 74 and the peripheral part 80 can be reduced according to the valve apparatus 10.

Based on those described above, the valve apparatus 10 can improve its shut-off performance when the inflow section 8 is closed.

According to the valve apparatus 10, the valve seat 74 may have its outer circumferential surface engage with the valve 76. This enables the buffering section 84 to be formed not on an inner circumference of the valve seat 74 but on the outer circumference of the valve seat 74. As a result of this, the outflow of the exhaust gas 92 from between the valve seat 74 and the valve 76 can be reduced according to the valve apparatus 10.

In the present embodiment, the valve apparatus 10 is configured to be utilized in the exhaust heat recovery device 1.

Due to the improved shut-off performance of the valve apparatus 10 as mentioned above, the outflow of the exhaust gas 92 through between the valve seat 74 and the valve 76 can be reduced when the valve is closed in the exhaust heat recovery device 1. This can increase a flow volume of the exhaust gas 92 that flows into the heat exchange section 6 when the valve is closed, and thus can improve efficiency of heat-recovery from exhaust heat according to the exhaust heat recovery device 1.

In particular, in the exhaust heat recovery device 1 of the present embodiment, the heat-exchanger-facing inner surface 62 of the guiding member 56 is disposed inwards, in the radial direction of the exhaust pipe 12, in relation to the end portion 38 of the heat exchanger 30, the end portion 38 being situated on a side closer to the axial center of the exhaust pipe 12.

This can reduce narrowing of the flow path for the exhaust gas 92 to the heat exchanger 30 in the inflow section 8 according to the exhaust heat recovery device 1, and thus can reduce lowering of pressure loss at the inflow port from the inflow section 8 to the heat exchange section 6.

This enables the exhaust gas 92 to reach deep into the heat exchange section 6, and thus enables recovery of a large volume of heat from the exhaust gas 92 according to the exhaust heat recovery device 1.

[Other Embodiment]

Though the embodiment of the present invention has been described above, the present invention is nevertheless not limited to the aforementioned embodiment and can be carried out in various modes within a scope not departing from the spirit of the present invention.

For example, though the heat-exchanger-facing inner surface 62 of the guiding member 56 is disposed inwards, in the radial direction of the exhaust pipe 12, in relation to the end portion 38 in the aforementioned embodiment, the heat-exchanger-facing inner surface 62 of the guiding member 56 may nevertheless be disposed on a straight line that extends along the radial direction of the exhaust pipe 12 from the end portion 38 in the present disclosure.

Figure 3:
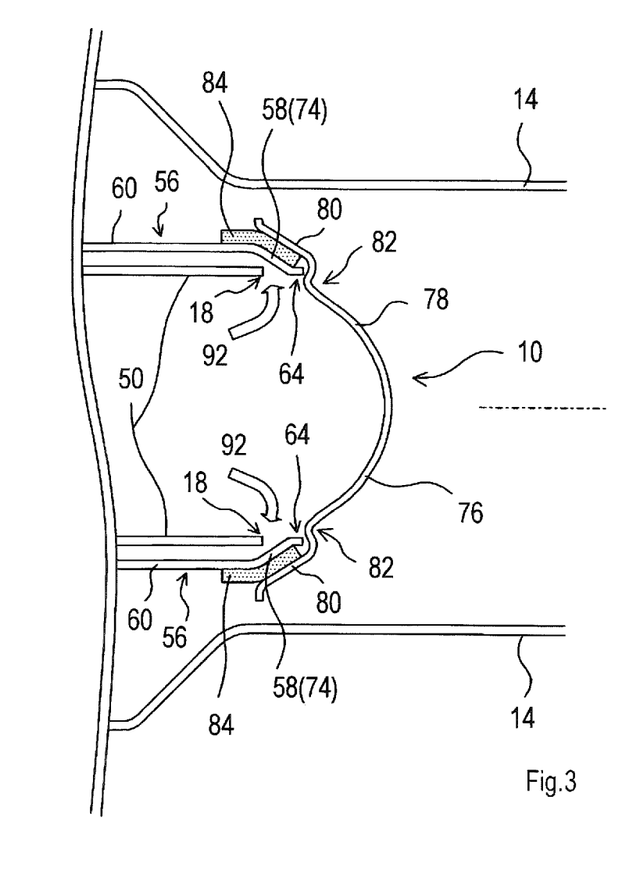
FIG. 3 is a sectional view of main components of the exhaust heat recovery device, showing a modified example of a valve seat.

In addition, the guiding downstream end 64 of the guiding member 56 may be extended towards the valve body 78 as shown in FIG. 3. In this case, a downstream-end portion of the buffering section 84 along the flow path for the exhaust gas 92 in the exhaust pipe 12 may be disposed upstream of the guiding downstream end 64 in the flow path for the exhaust gas 92. FIG. 3 is a sectional view of main components showing a modified example of the valve seat 74.

If the guiding downstream end 64 of the guiding member 56 is formed as shown in FIG. 3, the length of the flow path for the exhaust gas 92 to reach the downstream-end portion of the buffering section 84 can be elongated. As a result of this, the outflow of the exhaust gas 92 through the buffering section 84 can be reduced, and the shut-off performance can be further improved according to the valve apparatus 10.

In the aforementioned embodiment, the tip part 58 of the guiding member 56 functions as the valve seat 74; nevertheless, the valve seat 74 in the present disclosure may be separately provided. In this case, the valve seat 74 may be joined to the guiding member 56 for use.

In the aforementioned embodiment, the valve body 78 is formed into a disk-like shape; nevertheless, the shape of the valve body 78 is not limited to the disk-like shape. For example, the valve body 78 may have a shape that forms an outward curve towards the downstream of the flow path for the exhaust gas 92 in the exhaust portion 2 as shown in FIG. 3, or may have other shapes.

Furthermore, the valve body 78 may have a projection at the center of the valve body 78 in the axial direction, the projection forming an outward curve towards the upstream of the flow path for the exhaust gas 92 in the exhaust portion 2.

Although the convex portion 82 is formed on the valve body 78 in the aforementioned embodiment, the convex portion 82 may be omitted in the valve body in the present disclosure.

Although the inflow port of the inflow section 8 is formed at the exhaust downstream end 18 of the exhaust pipe 12 in the aforementioned embodiment, a location to form the inflow port of the inflow section 8 is not limited thereto. In other words, the inflow port of the inflow section 8 may be formed upstream of the heat exchanger 30 on the exhaust pipe 12, or at the middle of the heat exchanger 30 on the exhaust pipe 12, as long as the inflow port is situated upstream of the valve apparatus 10 in the flow path for the exhaust gas 92.

Although the aperture between the exhaust downstream end 18 and the guiding member 56 is formed as the inflow port for the exhaust gas 92 to flow from the exhaust pipe 12 to the heat exchange section 6 in the aforementioned embodiment, the inflow port for the exhaust gas 92 to flow from the exhaust pipe 12 to the heat exchange section 6 may be formed by drilling a hole directly in the exhaust pipe 12.

Although the exhaust heat recovery device 1 in the aforementioned embodiment is mounted in a moving object that comprises the internal combustion engine 90, the exhaust heat recovery device of the present disclosure is not necessarily mounted in a moving object. In other words, the exhaust heat recovery device of the present disclosure may be used without being mounted in a moving object, as long as the exhaust heat recovery device recovers heat from the exhaust gas 92 by heat exchange using the exhaust gas 92 from the internal combustion engine 90 as the high-temperature fluid. In addition, the low-temperature fluid in the exhaust heat recovery device is not necessarily be the coolant 94; the low-temperature fluid may be other fluid that acts as a low-temperature fluid.

Although the heat exchanger 30 in the aforementioned embodiment is configured as a stacked plate heat exchanger, the heat exchanger of the present disclosure may be any heat exchanger that exchanges heat between the exhaust gas 92 as the high-temperature fluid and the coolant 94 as the low-temperature fluid.

In the aforementioned embodiment, the valve apparatus 10 is configured to be utilized in the exhaust heat recovery device 1. Nevertheless, the valve apparatus 10 is not limited to utilization in the exhaust heat recovery device 1, and may also be configured to be utilized in a muffler.

Figure 4:
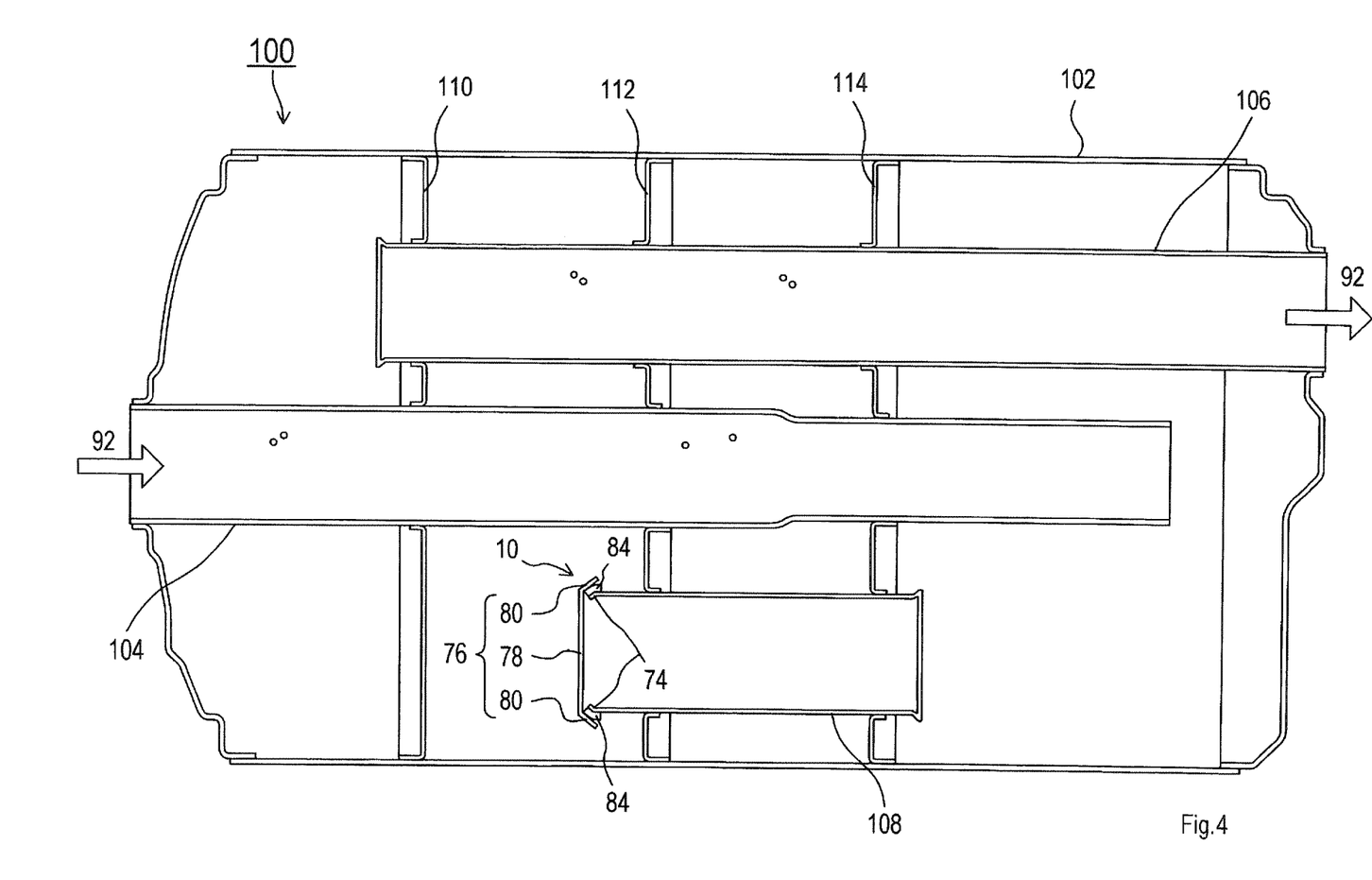
FIG. 4 is a diagram showing a muffler that uses a valve apparatus.

A muffler 100 that is shown in FIG. 4 as one example of the aforementioned muffler comprises an outer shell 102, an inlet pipe 104, an outlet pipe 106, an intermediate pipe 108, and the valve apparatus 10.

The outer shell 102 is partitioned into chambers by partition walls 110, 112, and 114 that have at least one hole drilled thereon. The inlet pipe 104 causes the exhaust gas 92 from the internal combustion engine 90 to flow into the outer shell 102. The outlet pipe 106 causes the exhaust gas 92 inside the outer shell 102 to flow outside the muffler. The intermediate pipe 108 connects the chambers inside the outer shell 102.

The valve apparatus 10 here is configured likewise in the aforementioned embodiment except for comprising the valve seat 74, the valve body 78, and the peripheral part 80, having one end of the intermediate pipe 108 function as the valve seat 74, and having the convex portion 82 omitted from the valve body 78. For this reason, identical elements are shown with the same reference numerals in the present embodiment, and detailed explanations of each elements to configure the valve apparatus 10 are omitted.

The valve body 78 of the valve apparatus 10 that is used in the muffler 100 may comprise the convex portion 82 formed thereon. The valve seat 74 may be exclusively provided, and is not limited to those that is one end of the intermediate pipe 108 functioned as the valve seat 74.

According to such a muffler 100, outflow of the exhaust gas 92, which flows through the intermediate pipe 108, from between the valve seat 74 and the valve 76 can be reduced. And, the flow path for the exhaust gas 92 inside the muffler 100 can be placed in a desired state.

The valve apparatus 10 is not limited to the aforementioned utilization, and may be utilized in any devices as long as the valve apparatus 10 is used to open/close the flow path for fluids. Moreover, the fluid in the present disclosure is not limited to the exhaust gas 92, and may also be other fluids.

A mode that omits a part of the configuration of the aforementioned embodiment is also an embodiment of the present invention. A mode that is configured by appropriately combining the aforementioned embodiment and the modified example is also an embodiment of the present invention. In addition, any and all modes that are conceivable within a scope not departing from the spirit of the invention specified by the language in the claims are also embodiments of the present invention.

The invention claimed is:

1. A valve apparatus that opens/closes a flow path for at least one fluid, the valve apparatus comprising:
   a valve seat in a tubular form that forms a part of the flow path for the at least one fluid, the valve seat positioned at an end of a tubular inlet-forming pipe section configured to guide flow of the at least one fluid in a downstream direction from an upstream location toward the valve seat; and
   a valve that closes the flow path for the at least one fluid by engaging with the valve seat;
   wherein the valve comprises a valve body including a peripheral part that (i) has a radial extent that is larger than an outer circumference of the valve seat, and (ii) is positioned in an upstream direction relative to the valve seat when the flow path for the at least one fluid is closed by the valve, with the upstream direction being opposed to the downstream direction;
   wherein the valve body, as a whole, has an outwardly curving cross-sectional shape in which a central portion of the valve body is displaced in the downstream direction relative to the peripheral part; and
   wherein a cross-section of the valve body comprises a convex portion, arranged between the peripheral part and the central portion of the valve body, that is formed inwardly in a radial direction, in relation to an inner circumference of the valve seat, and protrudes generally in the upstream direction relative to the central portion.

2. The valve apparatus according to claim 1, comprising a buffering section that comprises a buffer abutting the peripheral part and disposed on an outer circumferential surface of the valve seat.

3. An exhaust heat recovery device comprising:
   an exhaust pipe configured to carry at least one fluid embodied in an exhaust gas, wherein a portion of the exhaust pipe defines the tubular inlet-forming pipe section;
   a shell member that covers an exterior of the exhaust pipe;
   a heat exchange section that is disposed between the exhaust pipe and the shell member and comprises a heat exchanger that exchanges heat between the exhaust gas and a low-temperature fluid;
   an inflow section that comprises an inflow path for the exhaust gas to flow from the exhaust pipe into the heat exchange section; and
   the valve apparatus according to claim 1 that is arranged in the downstream direction relative to the inflow section, wherein the flow path for the at least one fluid embodies an exhaust gas flow path.

4. The exhaust heat recovery device according to claim 3, wherein a downstream-end portion of the exhaust pipe, situated at a downstream side of the exhaust gas flow path, is an exhaust downstream end,
   wherein the exhaust downstream end is disposed downstream of a downstream-end portion of the heat exchanger in the exhaust gas flow path,
   wherein the inflow section comprises
      an inlet-forming section that is an area on the exhaust pipe, from the exhaust downstream end to a point corresponding to the downstream-end of the heat exchanger; and
      a guiding member that is disposed, with a clearance from the inlet-forming section, to cover at least a part of an exterior of the inlet-forming section along a radial direction, and functions as the valve seat, and
   wherein a surface of the guiding member, the surface being close to a portion of the guiding member that is connected to the heat exchange section and the surface radially facing an axial center of the exhaust pipe, is disposed inwardly in a radial direction of the exhaust pipe in relation to an end portion of the heat exchanger, the end portion situated on a side closer to the axial center of the exhaust pipe; or, the surface is disposed on a straight line that extends along an axial direction of the exhaust pipe from the end portion of the heat exchanger, the end portion situated on a side closer to the axial center of the exhaust pipe.

5. The valve apparatus according to claim 2, wherein the buffer comprises a mesh member.

6. The valve apparatus according to claim 1, wherein the convex portion comprises an annular shape when viewed in the downstream direction from the upstream location.

* * * * *